United States Patent [19]
Jabbarnezhad

[11] Patent Number: 5,901,208
[45] Date of Patent: May 4, 1999

[54] METHOD AND SYSTEM FOR COMBING MODULAR AVAILABILITY PROJECTIONS IN A TELECOMMUNICATION SYSTEM

[75] Inventor: Javid Jabbarnezhad, Parker, Tex.

[73] Assignee: MCI Worldcom, Inc., Ga.

[21] Appl. No.: 08/772,654

[22] Filed: Dec. 23, 1996

[51] Int. Cl.$^6$ .................................................. H04M 15/00
[52] U.S. Cl. ......................... 379/134; 379/34; 379/134; 379/112; 379/113; 379/207; 379/219; 379/221
[58] Field of Search ............................. 379/34, 133–134, 379/219–221, 279, 112, 113, 207

[56] References Cited

U.S. PATENT DOCUMENTS

| | | | |
|---|---|---|---|
| 4,594,477 | 6/1986 | Noirot | 379/221 |
| 4,991,204 | 2/1991 | Yamamoto et al. | 379/221 |
| 5,086,460 | 2/1992 | Ash et al. | 379/134 |
| 5,101,451 | 3/1992 | Ash et al. | 379/221 |
| 5,311,585 | 5/1994 | Armstrong et al. | 379/221 |
| 5,406,620 | 4/1995 | Pei | 379/221 |
| 5,537,611 | 7/1996 | Rajagopal et al. | 379/134 |
| 5,579,385 | 11/1996 | Wille et al. | 379/221 |
| 5,734,697 | 3/1998 | Jabbarnezhad | 379/32 |

OTHER PUBLICATIONS

Digital Networks, Error Performance Parameters and Objectives for International, Constant Bit Rate Digital Paths At or Above the Primary Rate, ITU–T Recommendation G.826 (Telecommunication Standardization Sector of International Telecommunications Union, Nov. 1993).

Maintenance, International Transport Network, Performance Limits for Bringing Into–Service and Maintenance of International PDH Paths, Sections and Transmissions, ITU–T Recommendation M.2100 (Telecommunication Standardization Sector of International Telecommunication Union, Jul. 1995).

*Primary Examiner*—Curtis A. Kuntz
*Assistant Examiner*—Duc Nguyen

[57] ABSTRACT

A system and method for characterizing actual availability of a long-haul path in a telecommunications network. The present invention subdivides the long-haul path into distinct modular components and determines availability for each modular component of the long-haul path. A composite end-to-end availability figure is determined by summing the modular component availabilities. The present invention comprises a telecommunications network comprising a plurality of interconnected switches to carry and route telecommunications traffic among customer endpoints, and an entry and exit gateway for performing protocol conversion from one communication network to another. A network management system is connected to the interconnected switches in the telecommunications network via control links, for monitoring availability for the telecommunications network. The system also includes a network monitoring processor for monitoring telecommunication networks owned and operated by other service providers upon an agreement, a trans-oceanic network management system for monitoring availability of undersea telecommunication equipment owned and operated by the service provider, an extrapolation processor used to determine availability for the modular components of a network not capable of being monitored by the service provider, and a performance processor for determining a composite availability from a plurality of modular component availabilities.

13 Claims, 6 Drawing Sheets

METHOD AND SYSTEM FOR COMBING MODULAR AVAILABILITY PROJECTIONS IN A TELECOMMUNICATION SYSTEM

BACKGROUND OF THE INVENTION

1. Field of the Invention

The present invention relates generally to telecommunications, and more particularly to a technique for evaluating and expressing availability of a long haul network.

2. Related Art

Among providers of telecommunication network services, the term "availability" refers to the portion of time that a given customer will be able to use a particular service or connection. Availability is measured in errored seconds, severely errored seconds, and unavailable seconds. According to ITU Recommendation G.826, an errored second (ES) represents one or more errors found in a set of consecutive bits (known as a block) being transmitted over the network within the time frame of a second. A severely errored block would contain 30% or more errored blocks within a one-second period. Unavailable seconds are the amount of seconds that the network is unavailable to the user, such as when the network is undergoing repair. Availability is a bi-directional connectivity. It can be measured electronically or from the time a network connection is undergoing repair by a craftsman.

The standard approaches for evaluating and expressing availability of an end-to-end path in a communications network, namely ITU recommendations M2100 and G.826, are solely based upon reliability estimates of the facilities that make up the path. These approaches do not include the substantial impact on availability caused by actions of network personnel in the course of maintaining the network facilities.

A substantial error is introduced as negotiators extrapolate short-haul availability figures to estimate long-haul values. This is commonly done in estimating end-to-end availability for trans-oceanic international connections. Unfortunately, such a connection usually comprises a series of communications links that vary in type, length, reliability, nationality, and ownership. Many times, the availability figures that are commonly accepted for, say, an undersea cable are arbitrarily decided by committee debates rather than empirically measured. The result is that an estimated availability including this type of communications link is usually many times worse than is actually experienced. For example, a 7500-km end-to-end intercontinental path is projected by M2100 to suffer at least 138 errored seconds every 24 hours. Conciliatory negotiations might place this number even higher for lack of better information. This results in poor expectations of performance and very lax maintenance action limits— especially considering that actual observed performance is on the order of 1 or 2 errored seconds per day. Thus, a simple extrapolation to estimate a long-haul performance is convenient, but inadequate.

What is needed is a means for characterizing actual availability for each portion of a long-haul path and then combining these "modular availabilities" into a composite end-to-end availability figure that is realistic. Further, what is needed is a system and method that can assemble a composite availability projection from a mixture of such empirically-derived availabilities for some segments and M2100-compliant estimates for other segments. For some segments, the latter figure may be decidedly adequate.

SUMMARY OF THE INVENTION

Briefly stated, the present invention is directed to a system and method for characterizing actual availability of a long-haul path in a telecommunications network. The present invention subdivides the long-haul path into distinct modular components and determines availability for each modular component of the long-haul path. A composite end-to-end availability figure is determined by summing the modular component availabilities. The present invention comprises a telecommunications network comprising a plurality of interconnected switches to carry and route telecommunications traffic among customer endpoints, and an entry and exit gateway for performing protocol conversion from one communication network to another. A network management system is connected to the interconnected switches in the telecommunications network via control links, for monitoring availability for the telecommunications network. The system also includes a network monitoring processor for monitoring telecommunication networks owned and operated by other service providers upon an agreement between providers, a trans-oceanic network management system for monitoring availability of undersea telecommunication equipment owned and operated by the service provider, an extrapolation processor used to determine availability for the modular components of a network not capable of being monitored by the service provider, and a performance processor for determining a composite availability from a plurality of modular component availabilities.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the digit(s) to the left of the two rightmost digits in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

The present invention is a system and method for characterizing actual availability of a long-haul path in a telecommunications network. The present invention allows a more accurate assessment of long-haul availability than standard approaches and generally provides a more favorable and more accurate view of availability that a service provider is likely to want to convey to a prospective customer. The present invention subdivides the long-haul path into distinct modular components and determines availability for each modular component of the long-haul path. A composite end-to-end availability figure is determined by summing the modular component availabilities. Alternatively, the composite end-to-end availability figure is determined by statistically summing the modular component availabilities.

Figure 1:
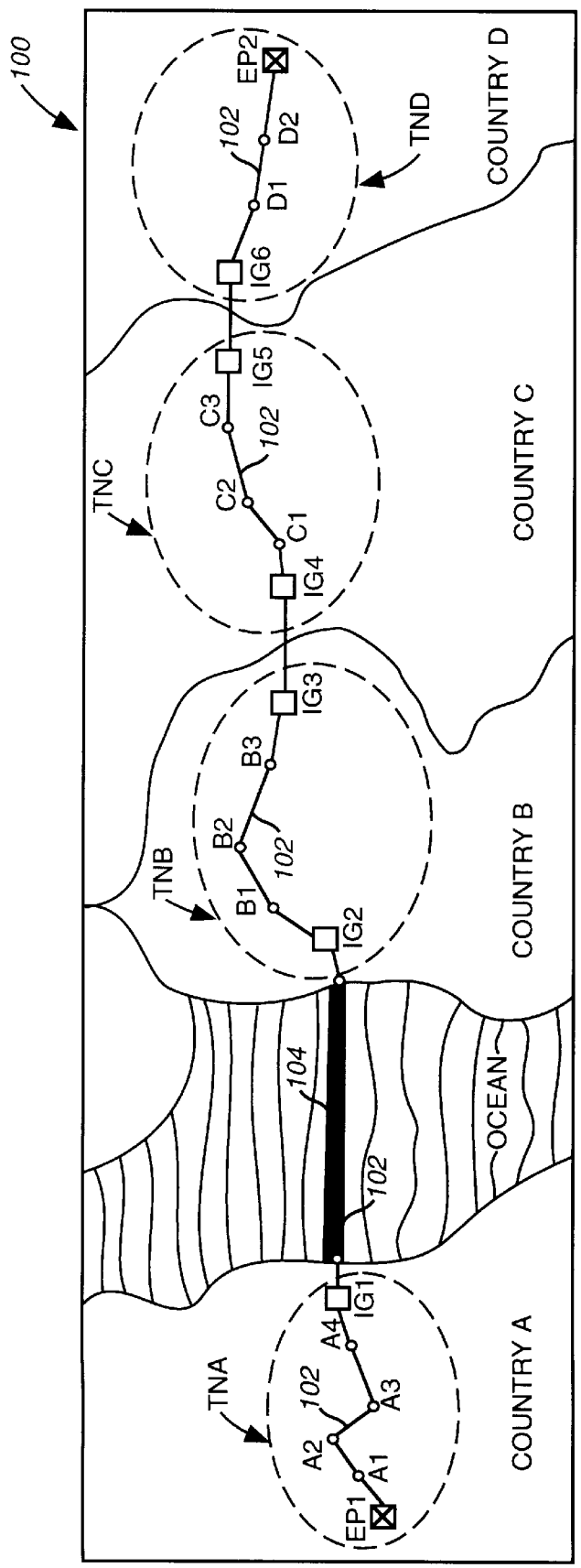
FIG. 1 illustrates an example of an end-to-end long haul path in a communications network.

An example of an end-to-end long haul path 102 in a communications network 100 that joins customer endpoints EP1 and EP2 is shown in FIG. 1. The long-haul path 102 begins at endpoint EP1 in country A and travels across trans-oceanic waters (shown as under sea cable 104), through countries B and C, to endpoint EP2 in country D. International gateways, IG1–IG6, are located at each entry and exit point for each country (countries A, B, C, and D). An international gateway is a device for connecting two different types of communications networks. International gateways perform protocol conversion from one communication network to the other, and are well known to person(s) skilled in the relevant art(s). Each country's telecommunication network, TNA–TND, is representative of a series of communication links that vary in type, length, reliability, nationality, and ownership. Each telecommunication network, TNA–TND, is comprised of a multitude of interconnecting switches (A1–A4, B1–B3, C1–C3, D1 and D2) and other network elements (not shown). The interconnecting switches (A1–A4, B1–B3, C1–C3, D1 and D2) carry and route telecommunications traffic among customer endpoints.

Figure 2:
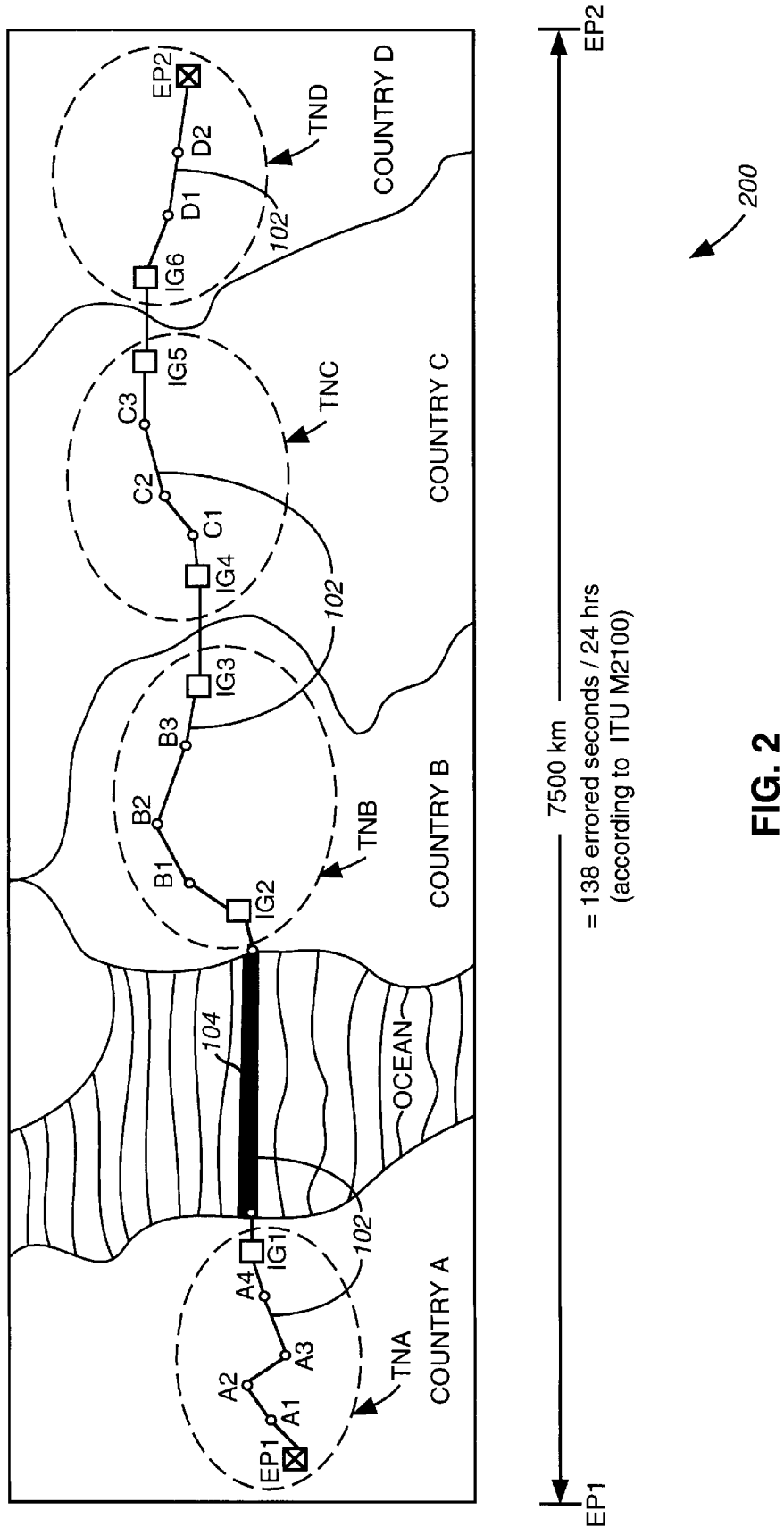
FIG. 2 illustrates the standard approach for evaluating and expressing availability of the end-to-end long haul path in a communications network.

A standard approach 200 for evaluating and expressing availability of the end-to-end long haul path 102 is shown in FIG. 2. The standard approach 200 used in evaluating availability for the end-to-end long haul path 102 is estimated in accordance with ITU M2100 recommendations. Using a geographic map, the aerial distance between the two end points EP1 and EP2 is determined using a straight line approximation. Since communication links in a telecommunications network are a combination of straight lines and curves, the aerial distance is increased by 20% to obtain a more realistic approximation of the actual circuit mileage of the communication links. A simple extrapolation is performed using this distance value to estimate the performance of the end-to-end long haul path 102. Performance is measured in errored seconds. An errored second (ES) represents one or more errors found in a set of consecutive bits (known as a block) being transmitted over the network within the time frame of a second. The actual circuit mileage for the end-to-end long haul path in the present example is 7500-km. According to ITU M2100, a 7500-km end-to-end path suffers at least 138 errored seconds every 24 hours.

Prior to discussing the present invention, ways in which a service provider may obtain availability measurements of a foreign telecommunications network, such as TNB–TND, are discussed. For countries having monitoring units on-line with their telecommunication networks, service providers can negotiate to use and monitor the performance of their telecommunications networks. There are many techniques available for allowing a service provider to monitor a foreign telecommunications network. For instance, one could use a conventional modem arrangement connected to the monitoring system of the foreign telecommunications network on one end and to a processor on the service provider's end in a manner well known to persons skilled in the relevant art(s). The service provider could then dial in and pull the information back. Another method, well known to those skilled in the relevant art(s), might involve extracting the information from overhead bits transmitted in the fiber stream of fiber optic cables and switches, if fiber optic technology is utilized. Thus, performance data is collected via in-line channels and stored in a central location, such as a database. Obtaining performance data, from an apparatus perspective, depends on implementation, and there are a multitude of ways in which one could accomplish this task of monitoring a foreign telecommunications network.

Sometimes negotiations result in a country providing the performance information to the service provider, allowing the service provider to store this information in a database, lookup table, etc.

Figure 3:
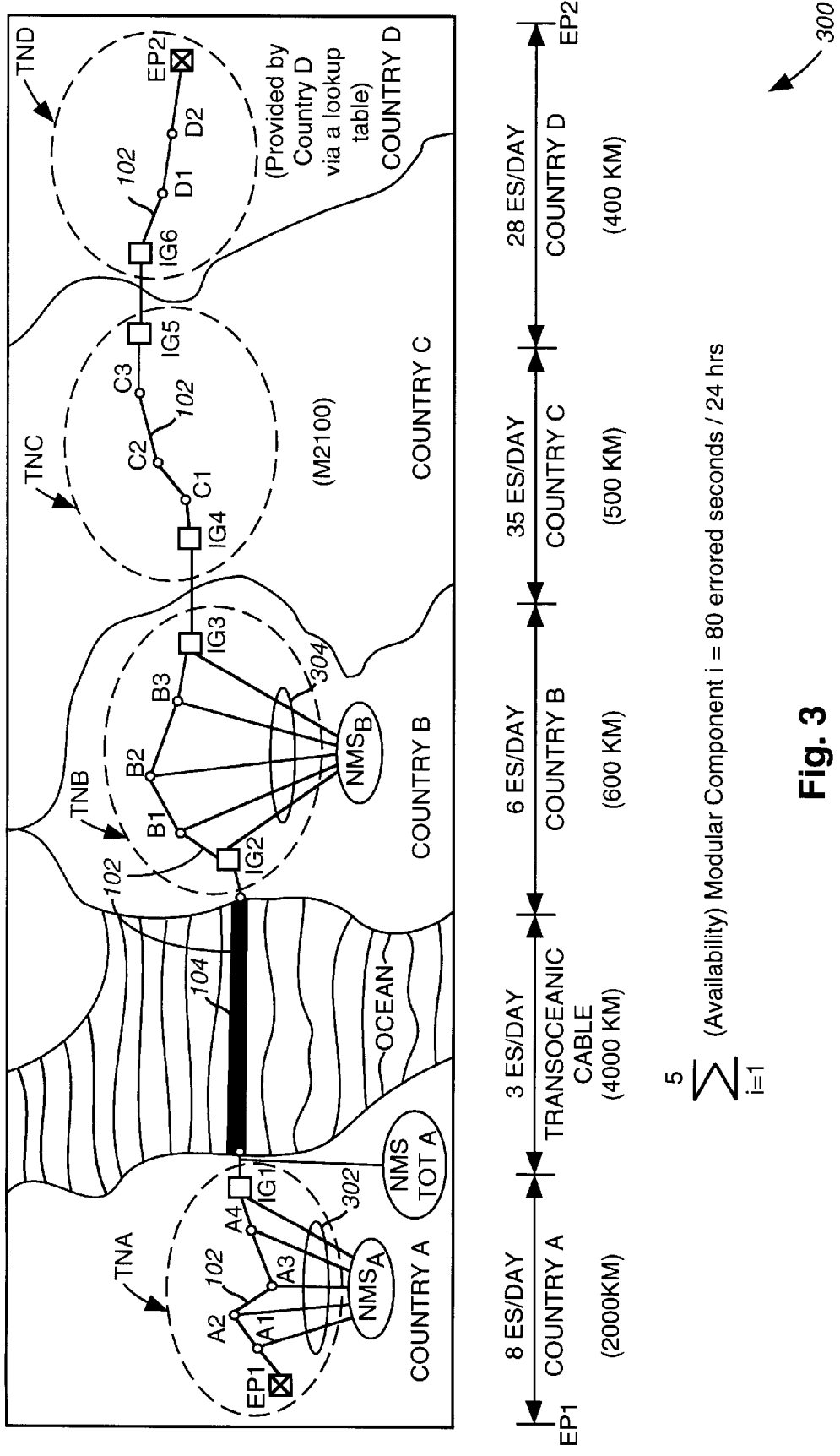
FIG. 3 illustrates a preferred embodiment of the present invention for dividing an end-to-end long haul path into modular components for evaluating and expressing availability for each portion of the long-haul path.

A preferred embodiment for evaluating and expressing availability of the end-to-end long-haul path 102 is shown in FIG. 3. As previously stated, the present invention divides the end-to-end long haul path 102 into modular components. The preferred embodiment divides the end-to-end long path 102 into modular components based on nationality and ownership. In an alternative embodiment, the modular components could be based solely on ownership or solely on nationality.

The end-to-end long haul path 102 is divided into five distinct sections, each section representative of a country or trans-oceanic territory. The first section is representative of telecommunications network A, TNA. TNA includes end point EP1, interconnected switches A1–A4, and international gateway IG1 (shown in country A). Each of these components (EP1, A1–A4, and IG1) are connected to a network management system, NMS A, through control links 302. The control links 302 allow control signals to be sent from NMS A to the TNA components (EP1, A1–A4, and IG1) and status signals to be collected from the TNA components (EP1, A1–A4, and IG1) to NMS A. NMS A monitors the switching activity and the performance of TNA. NMS A measures 8 errored seconds/day.

The second section is representative of the undersea cable 104 that crosses the trans-oceanic territory owned by country A, TOTA, and joins international gateways IG1 and IG2. The performance of this link can be monitored at either end using a NMS controlled by country A (NMS TOTA). NMS TOTA measures 3 errored seconds/day.

The third section is representative of telecommunications network B, TNB. TNB includes interconnecting switches B1–B3 and international gateways IG2 and IG3 (shown within country B). Each of these components, B1–B3, IG2, and IG3, are connected to a network management system, NMS B, through control links 304. NMS B is operated and controlled by country B and empirically characterizes the performance of TNB. NMS B is monitored by the service provider company of country A and measures 6 errored seconds/day.

The fourth section, representative of telecommunications network C, TNC, consists of interconnecting switches C1–C3, and international gateways IG4 and IG5. Availability for network TNC is estimated in accordance with standard approaches such as ITU M2100 or G.826. For this section, empirically derived availability measurements may not be obtainable for political or technical reasons. One such reason could be that the network, owned and operated by country C, does not contain a NMS that continuously measures the performance of the network. Another reason could be that TNC is owned by a government that does not allow companies from other countries to monitor their NMS. Thus, after determining the circuit mileage to be 500 km, availability was extrapolated as 35 errored seconds/day.

The last section, representative of telecommunication network D, TND, consists of international gateway IG6, interconnecting switches D1 and D2, and endpoint EP2. Negotiations with country D resulted in empirical values of availability being provided by country D and stored in a lookup table. The reported availability was 28 errored seconds/day.

In the lower half of FIG. 3, the long haul path 102 connecting EP1 and EP2 is schematically summarized and annotated with the availability figures for each modular section. An overall availability figure is determined by summing each modular component availability figure, resulting in 80 errored seconds/day. Note that the resulting overall availability figure is considerably better than the typical M2100 method applied to the entire end-to-end long haul path 102, shown in FIG. 2.

Figure 4:
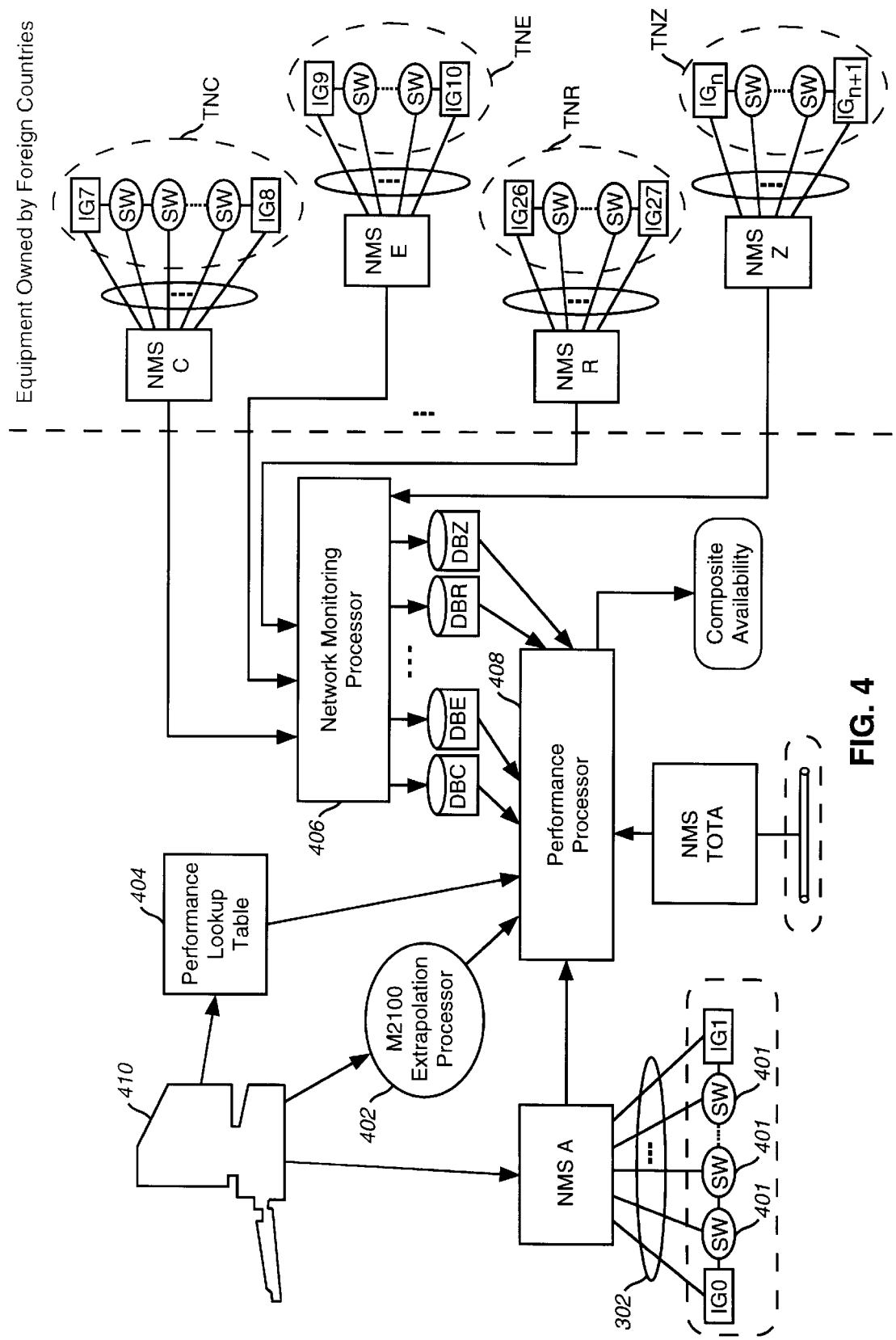
FIG. 4 illustrates a system for characterizing and combining "modular availabilities" for each portion of a long-haul path into a composite end-to-end availability figure.

As previously stated, the present invention is a system and method for combining modular availability projections in a telecommunication system. An implementation of the preferred embodiment of the present invention is shown in FIG. 4. The system comprises telecommunication network A, TNA, network management system A, NMS A, a M2100 extrapolation processor 402, a performance lookup table 404, a network monitoring processor 406, a network management system for the trans-oceanic territory, NMS TOTA, a plurality of databases (DBC, DBE, . . . DBR, and DBZ), a performance processor 408, and a workstation 410. Telecommunication network A, TNA, comprises a plurality of interconnected switches 401, international gateways IG0 and IG1, and other network elements (not shown). The interconnected switches 401 carry and route telecommunications traffic among customer endpoints. Each interconnected switch 401 is also connected to the network management system NMS A, through control links 302. The control links 302 carry control information to the interconnected switches 401, international gateways IG0 and IG1, etc. and availability data is returned to the network management system NMS A.

A workstation 410 is used to update a performance lookup table 404 with availability data provided to the service provider from various foreign telecommunication networks. Workstation 410 also allows network personnel to enter data, such as endpoints, aerial distances, etc.

A network monitoring processor 406 is used to monitor those telecommunications networks (TNC, TNE, . . . , TNR, and TNZ) in which the service provider has monitoring agreements. Connections to these telecommunication networks (TNC, TNE . . . TNR, and TNZ) are achieved via modem, in-line monitoring of fiber-optic lines, etc. Connected to the network monitoring processor 406 are databases (DBC, DBE, . . . , DBR, and DBZ) that correspond to each telecommunications network (TNC, TNE, . . . , TNR, and TNZ) being monitored by the network processing monitor 406.

An M2100 extrapolation processor 402 is used to determine availability for those networks in which the service provider does not have agreements. A separate network management system (NMS TOTA) is used to measure availability for trans-oceanic undersea cables owned by country A. The NMS TOTA operates in a similar fashion to NMS A.

A performance processor 408 is used to determine a composite availability figure by summing the individual availability figures from each modular component. Alternatively, the performance processor 408 determines composite availability by statistically summing the individual availability figures from each modular component for the best, worst, or average case.

Figure 5:
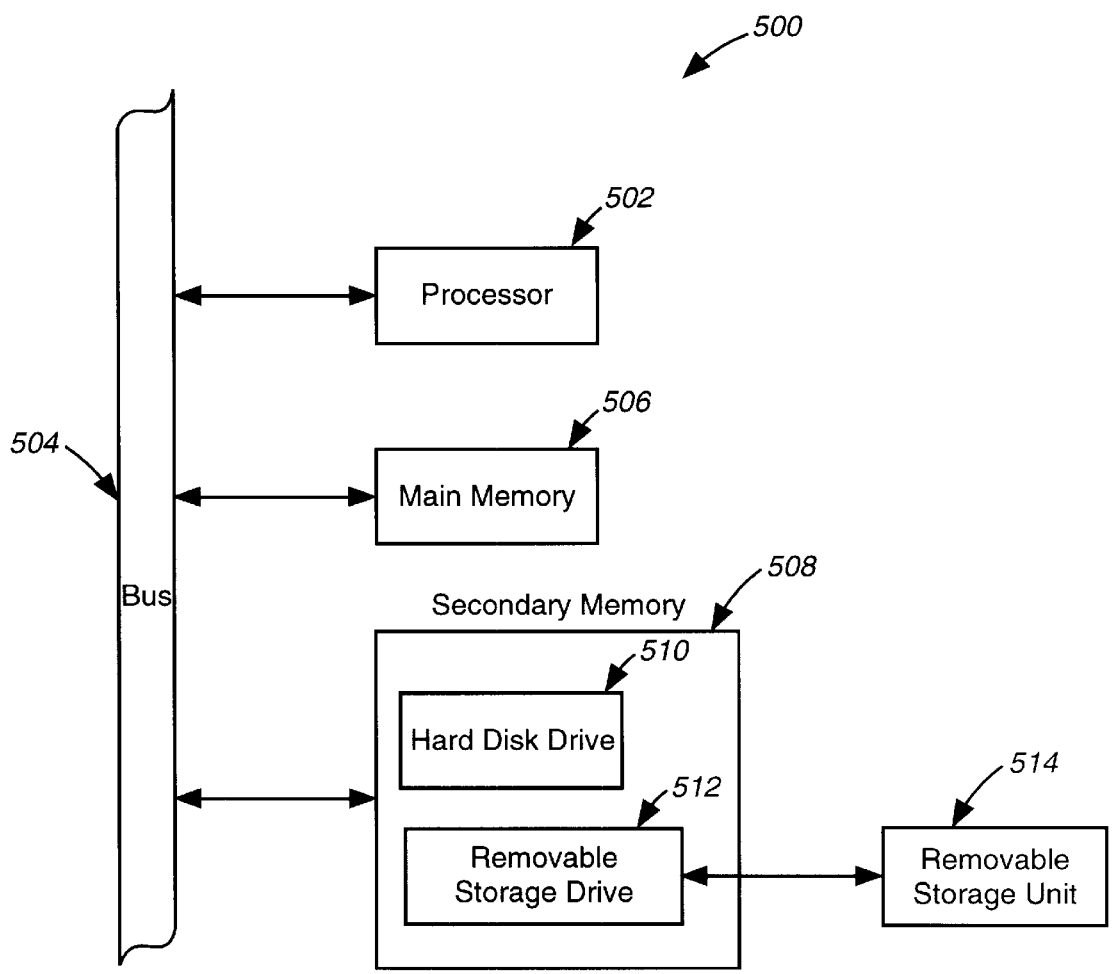
FIG. 5 illustrates an exemplary computer system to which the present invention is directed.

The databases, DBC, DBE, . . . DBR, and DBZ, and the network monitoring processor 406 can be implemented, at least partially, using a computer system, such as the computer system 500 shown in FIG. 5. The computer system 500 can also be used to implement the performance lookup table 404, the M2100 extrapolation processor 402, NMS A, NMS TOTA, and performance processor 408. Alternatively, NMS A can be implemented using a separate computer system, such as the computer system 500 shown in FIG. 5.

The computer system 500 includes one or more processors, such as processor 502. The processor 502 is connected to a communication bus 504.

The computer system 500 also includes a main memory 506, preferably random access memory (RAM), and a secondary memory 508. The secondary memory 508 includes, for example, a hard disk drive 510 and/or a removable storage drive 512, representing a floppy disk drive, a magnetic tape drive, a compact disk drive, etc. The removable storage drive 512 reads from and/or writes to a removable storage unit 514 in a well known manner.

Removable storage unit 514, also called a program storage device or a computer program product, represents a floppy disk, magnetic tape, compact disk, etc. The removable storage unit 514 includes a computer usable storage medium having stored therein computer software and/or data.

Computer programs (also called computer control logic) are stored in main memory and/or the secondary memory 508. Such computer programs, when executed, enable the computer system 500 to perform the features of the present invention as discussed herein. In particular, the computer programs, when executed, enable the processor 502 to perform the features of the present invention. Accordingly, such computer programs represent controllers of the computer system 500.

In another embodiment, the invention is directed to a computer program product comprising a computer readable medium having control logic (computer software) stored therein. The control logic, when executed by the processor 502, causes the processor 502 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant art(s).

Figure 6:
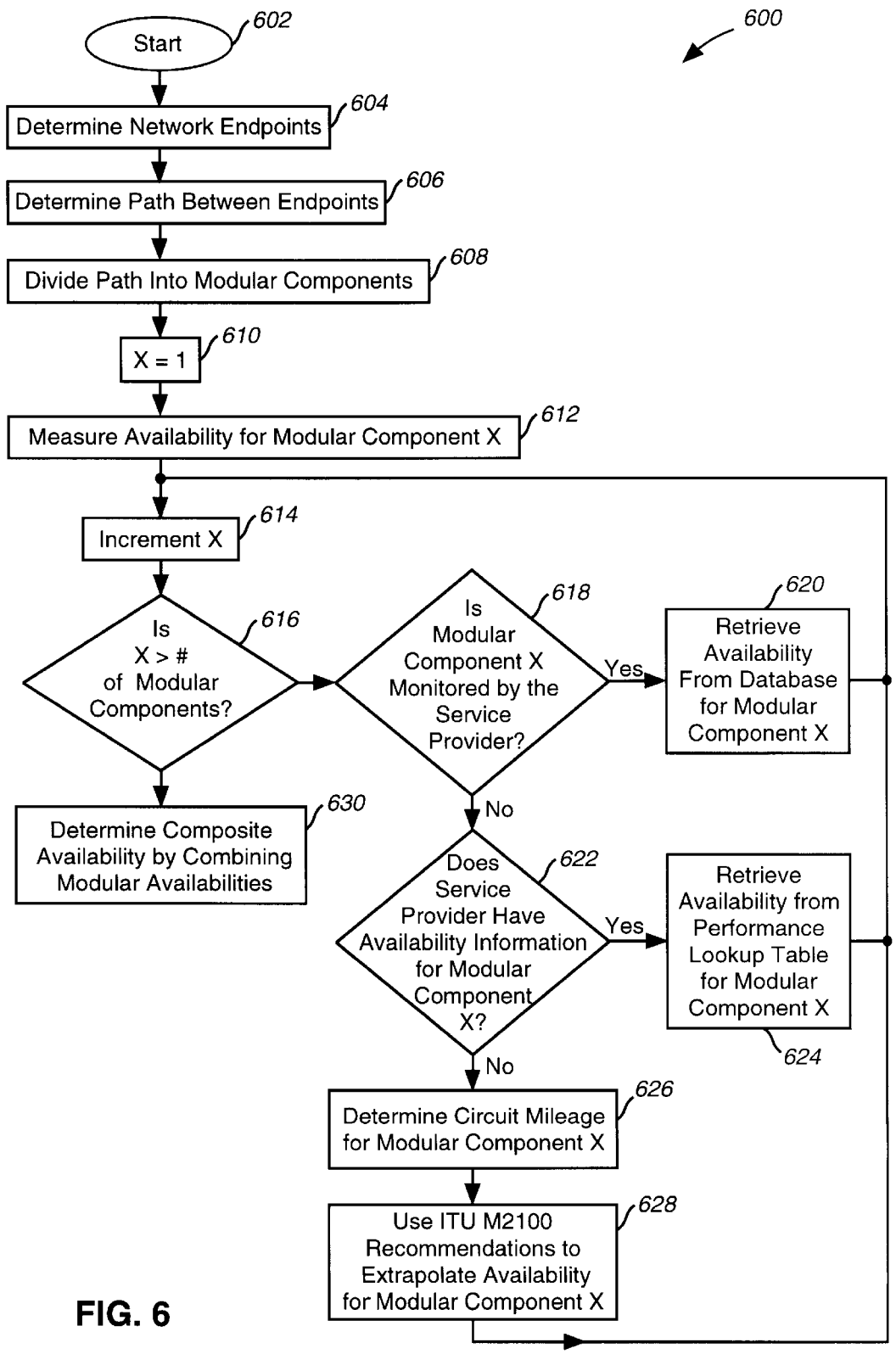
FIG. 6 illustrates a method for characterizing and combining "modular availabilities" for each portion of a long-haul path into a composite end-to-end availability figure.

The overall system process 600 is described in FIG. 6. The system process 600 starts in step 602. In step 604, the service provider determines the network endpoints. Network endpoints correspond to where the call originates from and where the call will terminate. In step 606, the transmission path between the endpoints, or end-to-end long haul path is determined. Factors that aid in determining the transmission path include performance and available capacity to handle the call. This can be determined by an operator executing the system or via an intelligent software platform. Once the long haul path has been determined, in step 608 the long haul path is divided into modular components based on such factors as nationality and ownership.

A counter is initialized to "1" in step 610, and the service provider network management system A, NMS A, is read to obtain the availability of the first portion or modular component of the long-haul path in step 612. The counter is incremented in step 614, and, it is determined whether the counter exceeds the number of modular components in step 616. If the counter does not exceed the number of modular components, control is passed to step 618. In step 618, it is determined whether modular component X, X being representative of the counter, is being monitored by the service provider. In other words, it is determined whether the service provider has an agreement to monitor the availability of modular component X. If the service provider does, control passes to step 620 where availability is retrieved from the database associated with modular component X. Control is then returned to step 614 to increment the counter.

Referring back to step 618, if modular component X is not being monitored by the service provider, control is passed to step 622. In step 622, it is determined whether availability information was provided by modular component X to the service provider and stored in a lookup table. If availability is available in the performance lookup table, availability for modular component X is retrieved from the performance lookup table in step 624. Control is then returned to step 614 to increment the counter.

Referring back to step 622, if it is determined that no agreement exists between modular component X and the service provider, control passes to step 626 where availability is determined using standard approaches, such as ITU recommendations M2100 and G.826. In step 626, circuit mileage for modular component X is determined. In step 628, the circuit mileage from step 626 is used to extrapolate availability for modular component X. Control is then returned to step 614 to increment the counter.

Referring back to step 616, if X is greater than the number of modular components, control is passed to step 630. In step 630, a composite availability is determined by combining all of the modular availabilities for that end-to-end long-haul portion.

While various embodiments of the present invention have been described above, it should be understood that they have been presented by way of example only, and not limitation. For example, the method of dividing a long-haul path into modular components to determine availability can be applied equally to short-haul paths composed of various types of networks. The short haul path could be divided into modular components based on network type. Thus, the breadth and scope of the present invention should not be limited by any of the above-described exemplary embodiments, but should be defined only in accordance with the following claims and their equivalents.

What is claimed is:

1. A method for determining availability of a telecommunications network by a service provider, comprising the steps of:
    (1) determining a first and second endpoint, said first endpoint indicative of where the call is being made from, said second endpoint indicative of where the call is being made to;
    (2) determining a path between said endpoints;
    (3) dividing said path into a plurality of modular components, wherein each of said modular components represents a different portion of said path;
    (4) empirically measuring availability for the first of said modular components;
    (5) determining availability for each of said remaining modular components, wherein said determining step comprises the steps of:
        (a) retrieving availability from a database indicative of said modular component, if an agreement exists for said modular component to be empirically monitored by the service provider;
        (b) retrieving availability from a lookup table indicative of said modular component, if an agreement exists for availability empirically provided to the service provider;
        (c) determining circuit mileage for said modular component, if step (a) and step (b) do not apply; and
        (d) extrapolating availability for said modular component using the circuit mileage from step (c); and
    (6) determining a composite availability by combining said availability for each of said plurality of modular components.

2. The method of claim 1, wherein said step (3) comprises the step of dividing said path according to nationality and ownership.

3. The method of claim 2, wherein step (6) comprises the step of summing said availability for each of said plurality of modular components.

4. The method of claim 2, wherein step (6) comprises the step of statistically summing said availability for each of said plurality of modular components for best case, worst case, and average case.

5. A system for determining availability of a telecommunications network by a service provider, comprising:
    means for determining a first and second endpoint, said first endpoint indicative of where the call is being made from, said second endpoint indicative of where the call is being made to;
    means for determining a path between said endpoints;
    means for dividing said path into a plurality of modular components, wherein each of said modular components represents a different portion of said path;
    means for empirically measuring availability for the first of said modular components;
    means for determining availability for each of said remaining modular components, wherein said means for determining availability comprises:
        means for retrieving availability from a database indicative of said modular component, if an agreement exists for said modular component to be empirically monitored by the service provider;
        means for retrieving availability from a lookup table indicative of said modular component, if an agreement exists for availability empirically provided to the service provider;
        means for determining circuit mileage for said modular component, if said means for retrieving availability from a database and said means for retrieving availability from a lookup table do not apply; and
        means for extrapolating availability for said modular component using the circuit mileage; and
    means for determining a composite availability by combining said availability for each of said plurality of modular components.

6. The system of claim 5, wherein said means for dividing said path comprises dividing said path according to nationality and ownership.

7. The system of claim 6, wherein said means for determining a composite availability comprises summing said availability for each of said plurality of modular components.

8. The system of claim 6, wherein said means for determining a composite availability comprises statistically summing said availability for each of said plurality of modular components for best case, worst case, and average case.

9. A system for determining availability in a telecommunications network, the system comprising:
    a telecommunications network, said telecommunications network comprising a multitude of interconnected switches to carry and route telecommunications traffic among customer endpoints, and an entry and exit gateway for performing protocol conversion from one communication network to another;

a network management system connected to said interconnected switches in said telecommunications network via control links, wherein said network management system monitors availability for said telecommunications network;

a plurality of databases, wherein each of said databases stores availability data for a network, said network owned and operated by one other than said service provider and being monitored by said service provider upon an agreement;

a performance lookup table, wherein said performance lookup table comprises availability data for telecommunication networks owned and operated by one other than said service provider and not being monitored by said service provider;

a network monitoring processor for monitoring telecommunication networks owned and operated by one other than said service provider upon an agreement, said network monitoring processor attached to said plurality of databases;

a trans-oceanic network management system for monitoring availability for undersea telecommunication equipment owned by said service provider;

an extrapolation processor, said extrapolation processor used to determine availability for modular components of a network not capable of being monitored by said service provider;

a performance processor, said performance processor connected to said plurality of databases, said performance lookup table, said extrapolation processor, said network management system, and said trans-oceanic network management system, for determining a composite availability from a plurality of modular component availabilities; and a workstation connected to said network management system, said extrapolation processor and said performance lookup table, whereby said workstation allows a user to interface with said system.

10. A computer program product comprising a computer useable medium having computer program logic recorded thereon for enabling a processor in a computer system to compute a composite availability by combining availability from a plurality of modular components, said computer program logic comprising:

means to enable said processor to determine a first and second endpoint, said first endpoint indicative of where the call is being made from, said second endpoint indicative of where the call is being made to;

means to enable said processor to determine a path between said endpoints;

means to enable said processor to divide said path into a plurality of modular components, wherein each of said modular components represents a different portion of said path;

means to enable said processor to empirically measure availability for the first of said modular components;

means to enable said processor to determine availability for each of said remaining modular components, wherein said means to enable said processor to determine availability comprises:

means to enable said processor to retrieve availability from a database indicative of said modular component, if an agreement exists for said modular component to be empirically monitored by the service provider;

means to enable said processor to retrieve availability from a lookup table indicative of said modular component, if an agreement exists for availability empirically provided to the service provider;

means to enable said processor to determine circuit mileage for said modular component, if said means to enable said processor to retrieve availability from a database and said means to enable said processor to retrieve availability from a lookup table do not apply; and means to enable said processor to extrapolate availability for said modular component using the circuit mileage; and means to enable said processor to determine a composite availability by combining said availability for each of said plurality of modular components.

11. The computer program product of claim 10, wherein said means to enable said processor to divide said path comprises dividing said path according to nationality and ownership.

12. The computer program product of claim 11, wherein said means to enable said processor to determine a composite availability comprises means to enable said processor to sum said availability for each of said plurality of modular components.

13. The computer program product of claim 11, wherein said means to enable said processor to determine a composite availability comprises means to enable said processor to statistically sum said availability for each of said plurality of modular components for best case, worst case, and average case.

* * * * *